Aug. 2, 1955　　　　I. R. AXELRAD　　　　2,714,226
APPARATUS FOR MOLDING PLASTIC MATERIALS
Filed Oct. 11, 1949

WITNESSES:

INVENTOR
Irving R. Axelrad.
BY
Frederick Shapoe
ATTORNEY

United States Patent Office 2,714,226
Patented Aug. 2, 1955

2,714,226

APPARATUS FOR MOLDING PLASTIC MATERIALS

Irving R. Axelrad, Pittsburgh, Pa., assignor to Westinghouse Electric Corporation, East Pittsburgh, Pa., a corporation of Pennsylvania Application October 11, 1949, Serial No. 120,660

2 Claims. (Cl. 18—30)

This invention relates to apparatus for molding plastic materials under pressure.

Heretofore apparatus for molding plastic materials under pressure has usually been made from metals or other relatively rigid and expensive materials. Such metal molds or dies are not only expensive but are heavy and cumbersome, requiring considerable storage space and time to install in presses or the like. The metal molds or dies are difficult to fabricate, often requiring weeks and months of time in their fabrication. Consequently, plastic members that are molded under pressure often require such a large and expensive investment in metal dies that they are relatively costly, even though the plastic material itself is quite inexpensive.

In apparatus for molding plastics under pressure, it has been accepted that the molds and dies must be made of rigid and non-deformable materials, such as metals. By their nature, such rigid and non-deformable materials are difficult to form into dies and molds. Furthermore, for the molding of plastics into members having complex shapes and undercut portions, the dies and molds are formed in several sections that can be separated to release the molded member. Such multipart molds are among the most expensive in the plastics industry.

The object of this invention is to provide for molding apparatus in which the molding of plastics under pressure is effected in molds formed from elastomers.

A further object of the invention is to provide pressure molding apparatus in which relatively fixed platens are provided with recesses in which elastomeric molds proper are supported.

A still further object of the invention is to provide elastomeric molds capable of use in pressure molding for forming members normally requiring metal molds with more parts than the elastomeric mold.

Other objects of the invention will, in part, be obvious and will, in part, appear hereinafter. For a better understanding of the nature and objects of the invention, reference should be had to the following detailed description and drawing, in which.

The present invention consists in providing press apparatus having a recess within a relatively rigid metal base in which a mold of an elastomer is disposed for support. The elastomeric mold is provided with a mold cavity into which a plastic material is introduced under pressure. The elastomeric mold is supported by the metal base so that it is not deformed or collapsed when the plastic is introduced thereinto under pressure. Elastomers when properly confined and supported are relatively incompressible and will take considerable compression without deforming significantly. The elastomeric molds may have relatively thin walls. The elastomeric molds are much smaller in size and shape than conventional molds or dies and may be stored and handled without difficulty. They are inexpensive and can be manufactured rapidly and conveniently. Many undercut members and similar structures normally requiring a multipart metal mold may be molded within the elastomeric mold and removed therefrom by simply flexing the sides of the elastomeric mold and extracting the member therefrom. Numerous other advantages of the molding apparatus of this invention will be set forth hereinafter.

Figure 1:
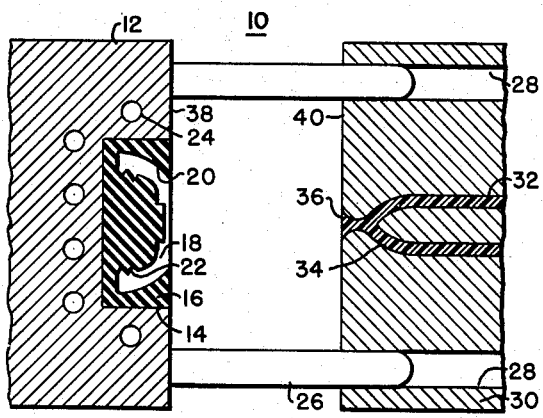
Figure 1 is a vertical cross section through an injection molding press.

Referring to Fig. 1 of the drawing, there is illustrated an injection molding press 10 comprising a metal base 12 having a recess 14 within which is disposed a mold 16 composed of an elastomer, such as natural rubber, neoprene, synthetic rubber, such as GR–S, or silicone rubber. It will be noted that the mold 16 has a mold cavity 18. The mold cavity 18 has an undercut portion 20 and a threaded portion 22. The base member 12 is provided with conduits 24 in which a cooling liquid is circulated in order to cool any plastic injected into the mold cavity 18 of the mold 16. Guide pins 26 affixed to the base 12 fit within channels 28 in a head 30 supported for movement relative to the base 12, whereby the faces 38 and 40 on the base and the head, respectively, may be brought into contact. The head 30 is provided with a heated plastic injection unit comprising a channel 32 in which the hot plastic material 34 may be injected through a flared gate orifice 36 into the cavity 18 of the mold 16. The means in head 30 for heating the plastic material 34 and forcing it through the channel 32 under pressure may be of any suitable construction as is well known.

In operation of the apparatus 10, the mold 16 is inserted into the recess 14 whose walls it fits closely. Thereafter, the base 12 and head 30 are brought into contact under sufficient pressure so that plastic material cannot exude between the meeting faces 38 and 40. The plastic material 34 is then forced into the mold cavity 18 under pressure. Since the elastomeric mold is completely confined, it cannot collapse or deform. Under compressive pressures, the elastomer does not change shape appreciably. Accordingly, the mold cavity will be filled solidly with plastic 34 under considerable pressure. The cooling medium in the conduits 34 will withdraw heat from the plastic by transfer through the relatively thin walls of the mold 16. Within a short period of time the plastic member in the cavity 18 will have solidified, and the head 30 may be separated from the base 12. In the case of the molding of the undercut and threaded member, as shown in Fig. 1, the entire mold 16 and the member solidified therein are withdrawn from the recess 14 by the adhesion of the gate in orifice 36 of resin in channel 32. Upon flexing the walls of the mold 20 and peeling it off the plastic member, the member and the gate may be readily extracted from the head 30. The mold 16 may be reinserted in the recess and another molding made therein. Alternatively, the mold, the molded member and gate 36 may be parted from the channel 32 and the mold stripped from the member. In other cases where the molded member may be easily withdrawn from the elastomeric mold without requiring much flexing, such separation of the plastic molding from the mold 16 will be effected automatically on retracting the head 30 without withdrawal of the mold from the recess 14. The gate of resin is cut or sawed off the plastic member.

The recess 14 may be of any suitable shape and size. Thus, the recess 14 may be in the shape of a circular prism, a square prism, or semispherical in shape. In some cases, the recess may have a slight lip at the face 38 engaging the mold 16 so that the mold will not accidentally fall out or become released.

The base 12 may be an integral part of the apparatus 10, or it may be a removable member such as a metal frame that may be replaced by another similar frame having a smaller or larger recess 14 to accommodate a different size or shape of rubber mold. Furthermore, more than one recess 14 may be present in the base. The molds in a multirecess base may have plastic introduced thereto from a single channel 32 or a plurality of such channels.

Figure 2:
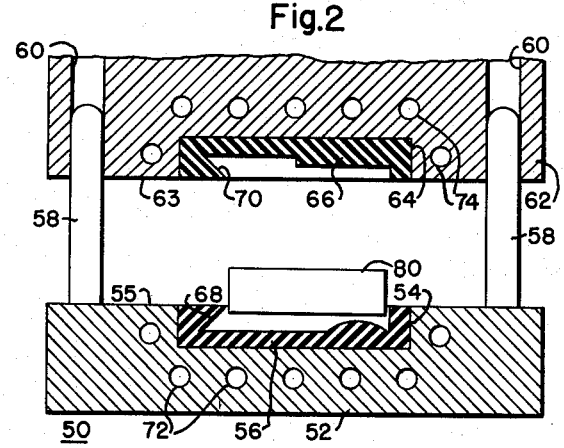
Fig. 2 is a vertical cross section through a compression molding press.

For molding many plastic materials, such, for example, as thermosettable phenolic powders, an injection molding apparatus is not convenient. For this purpose, a conventional compression press is preferable. Referring to Fig. 2 of the drawing, there is illustrated a compression press 50 comprising a lower platen 52 within which is a recess 54 extending inwardly from the face 55. Within the recess 54 is disposed an elastomeric mold 56. Guide pins 58 affixed to the platen 52 are disposed for slidable engagement with slots 60 in an upper platen 62 movable toward the lower platen 52. The upper and lower platens 62 and 52 are movable to cause contact to take place between the faces 55 of the lower platen and the face 63 of the upper platen. Extending inwardly from the face 63 of the upper platen is a recess 64 which is superimposable over the lower recess 54. Within the recess 64 is an elastomeric mold 66. The mold 56 contains a cavity 68 complementary to a cavity 70 in the mold 66. The lower platen 52 is provided with tubes 72 for receiving steam or cold water as required to heat or cool the platen and mold 56 therein and the upper platen 62 likewise carries tubes 74 for the circulation of steam or cold water, as required, for a similar purpose.

For molding either thermoplastic or thermosettable resins or other plastic materials, a quantity of the plastic material shown as a compact 80 is placed within the mold cavity 68 and the upper and lower platens are brought together under suitable pressure. By introducing steam into the tubes 72 and 74, the molds 56 and 66 are heated, and the plastic 80 is softened or rendered fluid. The plastic is forced under pressure into the cavities 68 and 70, and the press is operated to bring the platens together so that the faces 55 and 63 are in substantial contact. If the amount of plastic 80 has been properly proportioned, the mold cavities 68 and 70 will be completely filled. Thereafter, a suitable temperature and pressure may be applied until the plastic material has been completely thermoset and thereupon a cooling medium, such as water, is circulated through the tubes 72 and 74. For a thermoplastic material, heating of the molds may be discontinued when the plastic material has been softened sufficient to fill the mold cavities and cooling may be carried out immediately thereafter. The press platens may be separated when the plastic member has been sufficiently cooled, and the resulting molded member removed from the molds 56 and 66 and the molds may be reused.

I have molded terminal blocks and numerous other members from polystyrene, phenolic resins and the like, using both injection molding and compression molding apparatus, such as is illustrated in Figs. 1 and 2. The speed of molding has been comparable to the speed of molding employed with conventional all metal dies. The quality of the molded members has been comparable with those secured in all metal dies. Undercut members and complex shape members have been molded very satisfactorily in such elastomeric dies. It takes only a brief time to remove one elastomeric mold and substitute another for producing a different type of member. Members have been molded at pressures of up to 1500 p. s. i. and at temperatures of from 120° C. to 170° C. For the latter temperatures, use has been made of silicone rubber molds, while for the former, neoprene and GR-S rubber has been satisfactory.

Figure 3:
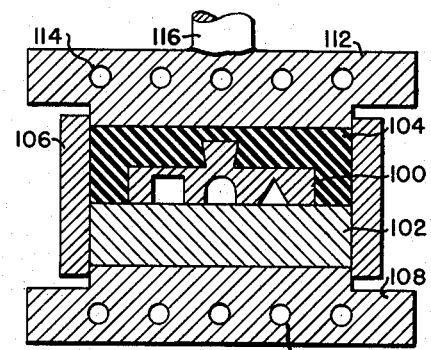
Fig. 3 is a vertical cross section of a press.

The making of the rubber mold inserts 16, 56 and 66 may be accomplished in several ways. Referring to Fig. 3 of the drawing, there is illustrated one method of preparing the elastomeric mold. A pattern member 100 which may be of wood, plastic, metal or plaster is placed upon a metal plate 102, and the pattern member 100 is covered with a selected quantity of an unvulcanized elastomer 104 that may be vulcanized by heat treatment. A ring 106 closely fitting about plate 102 maintains the lateral dimensions of the mass of elastomer 104. The metal plate 102 is disposed on a press base 108 provided with conduits 110 for heating the cooling fluids. The body of elastomer 104 is compressed by a movable press head 112, a portion of which fits into the ring 106, provided with conduits 114 for heating and cooling means. A ram 116 connected to a piston or other source of power enables the head 112 to be moved under desirable pressure to compress the elastomer 104 so that it will faithfully conform to the exposed surfaces of the pattern 100. Steam or other heating medium is admitted to the conduits 110, 114 while the elastomer is so compressed to vulcanize the elastomer 104. For certain types of flat faced moldings, the member 104 above may be employed in the Figure 1 or 2 apparatus after being vulcanized.

Figure 4:
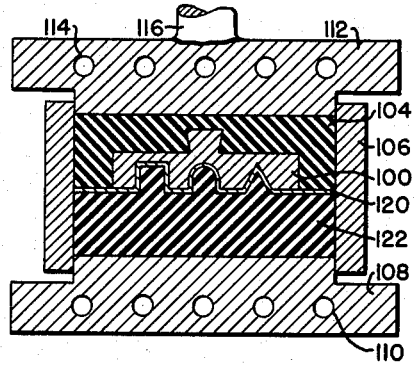
Fig. 4 is a vertical cross section through a press.
Figure 5:
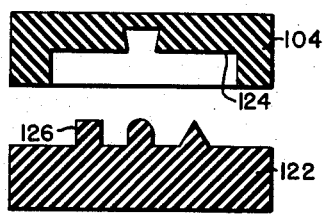
Fig. 5 is a vertical cross section through a rubber mold.

However, for producing a member corresponding to the shape of the pattern member 100, a two-part mold, such as shown in Fig. 2 of the drawing, is required. Accordingly, a second or complementary elastomeric mold is formed, as shown in Fig. 4 of the drawing. In this figure, the metal plate 102 is removed and the exposed under surfaces of the pattern 100 and the previously vulcanized elastomer 104 are coated with a layer of a parting medium 120 which may be a coating of graphite, talc or the like. Thereafter, a second body of uncured elastomer 122 capable of being heat vulcanized is placed within the ring 102 between the parting medium 120 and the base 108. After applying pressure through the ram 116 so as to force the elastomer 122 into all of the details of the bottom side of the pattern member 100, steam or other heating medium may be admitted to the conduits 114 and 110 to cause the elastomer 122 to become vulcanized. Thereafter the entire assembly may be cooled by introducing cold water into the conduits and the vulcanized elastomeric members 104 and 122 may be removed. Upon removing the pattern member 100, there results a complementary two-part mold, as shown in Fig. 5 of the drawing. The one mold of the elastomer 104 contains a mold cavity 124, and the other mold of elastomer 122 is characterized by projections 126 conforming to the bottom of the pattern member. These members may be inserted into recesses 54, 64, as shown in Fig. 2 of the drawing.

Other processes for forming the elastomeric molds may be employed. Several alternate processes are shown in the copending application Serial No. 79,096, filed March 1, 1949, in which I am one of the coinventors.

The elastomeric molds, and apparatus cooperating therewith, are adapted to the manufacture of small lots of various plastic items, particularly complex custom-molding members, at an exceptionally low cost and rapid production. With a pattern available, I have made an elastomeric mold and injected approximately 100 molded plastic parts in one day.

Since certain changes in carrying out the above process which embodies the invention may be made without departing from its scope, it is intended that all matter contained in the above description or shown in the accompanying drawing shall be interpreted as illustrative and not in a limiting sense.

I claim as my invention:

1. In an injection molding apparatus, a relatively rigid metal base having a face and a recess extending into the base from the face, a mold of an elastomeric material fitting into said recess, cooling means associated with the base, a head having a face matching the face on the base, means for moving the base and the head with respect to one another to bring the faces into matching contact and completely enclose the recess and the mold therein, the head having an opening in the face thereof disposed to open to the mold cavity, a heated plastic injection unit associated with the head to inject heated plastic material through said opening into the mold cavity, whereby when the head and base are in matching contact heated plastic material can be injected into the mold cavity under pressure and the elastomeric mold will withstand the pressures without significant distortion by reason of its complete confinement.

2. In an injection molding apparatus, a relatively rigid metal base having a face and a recess opening at the face and extending into the base, a mold of an elastomeric material disposed within the recess and fitting closely to the walls of the recess, the elastomeric mold having a shaped molding cavity for receiving plastic material therein through an opening in the elastomeric mold substantially in the plane of the face of the metal base, a relatively rigid metal head having a face matching the face on the base whereby when the head and base are brought together the faces fit tightly together and completely enclose the recess and the elastomeric mold, the head having an aperture leading directly into the opening in the elastomeric mold when the head and base are brought together, a plastic injection unit associated with the head to inject plastic material through said aperture into the opening and thence into the elastomeric mold cavity, the complete confinement of the elastomeric mold between the base and the head enabling injection molding of plastic members at pressure of up to 1500 p. s. i. without distortion of the molding cavity, the elastomeric mold being readily removable from the recess to enable molded plastic members to be withdrawn therefrom by flexing the walls of the elastomeric mold.

References Cited in the file of this patent

UNITED STATES PATENTS

| | | |
|---|---|---|
| 1,527,206 | Marquette | Feb. 24, 1925 |
| 1,834,763 | Bonsieur | Dec. 1, 1931 |
| 2,091,973 | Feesler et al. | Sept. 7, 1937 |
| 2,181,694 | Felcher | Nov. 28, 1939 |
| 2,290,910 | Jeffery | July 28, 1942 |
| 2,292,917 | Williams | Aug. 11, 1942 |
| 2,354,026 | Jungersen | July 18, 1944 |
| 2,368,327 | Rose | Jan. 30, 1945 |
| 2,441,988 | Brillhart et al. | May 25, 1948 |
| 2,448,640 | Weston | Sept. 7, 1948 |